Jan. 22, 1963 W. J. SCHOENMAKERS 3,075,185

MATRIX MEMORY DEVICE

Filed Jan. 28, 1960

INVENTOR

WIJNAND J. SCHOENMAKERS,

BY

AGENT

United States Patent Office 3,075,185
Patented Jan. 22, 1963

3,075,185
MATRIX MEMORY DEVICE

Wijnand Johannes Schoenmakers, Eindhoven, Netherlands, assignor to North American Philips Company, Inc., New York, N.Y., a corporation of Delaware Filed Jan. 28, 1960, Ser. No. 5,178
Claims priority, application Netherlands Feb. 13, 1959
5 Claims. (Cl. 340—174)

This invention relates to matrix memory devices.

Known devices of this kind comprise a plurality of memory elements each having a magnetic memory core of magnetic material having a comparatively high remanence and which are ranged it rows and columns of a matrix. The memory elements of the same row are coupled to the same row control-conductor and the elements of the same column are coupled to the same column control-conductor. The magnetic condition of remanence of the memory core of a given memory element may be varied by supplying simultaneously a pulse to the row conductor and the column conductor coupled to the element concerned.

Known devices have the drawback that the said pulses require a certain critical strength and that comparatively stringent requirements must be imposed upon the material of the memory cores with regard to the shape of the hysteresis loop. In fact, the strength of the pulses must be such that the field strength in the cores connected to only one of the conductors to which a pulse is supplied, does not exceed the value corresponding to the bend in the rectangular hysteresis loop, so that the magnetic state of these cores cannot be varied, whereas the magnetisation of the memory core which is coupled to both conductors and which this receives double the pulse passes to the opposite state provided that the pulses have the proper polarity.

Another disadvantage of known devices is that the double strength of the pulse which must bring about the change-over of magnetisation is but slightly greater than the coercive force of the material so that the speed of the change in magnetisation is limited since this speed is proportional to the overexcitation, that is to say, to the difference between the field strength applied and the coercive force.

In a matrix memory device according to the invention, the magnetic memory cores of same row are coupled to individual auxiliary conductors which are connected to the associated common row conductor. In addition, each of the individual auxiliary conductors is coupled to two auxiliary cores of magnetic material having a comparatively low magnetic remanence, which material shows magnetic saturation, the auxiliary cores of the memory elements of the same column being coupled to the associated column conductor, and the auxiliary cores of each pair being relatively coupled in opposition to the column conductors as compared with their coupling to the auxiliary conductors.

The auxiliary cores fulfil the functions of a kind of switches in series with the auxiliary conductors, since in the non-magnetized state of the auxiliary cores, the auxiliary conductors have a comparatively high inductance due to their being coupled to the auxiliary cores so that the current in the auxiliary conductors is limited, if a voltage pulse is supplied to the relevant row conductor, and the magnetic state of the memory core cannot change, whereas if a current is supplied to a column conductor, the auxiliary cores coupled thereto are brought into a state of magnetic saturation so that the auxiliary conductors coupled thereto have a very low inductance.

The said device affords the advantage that the material of the memory cores need not fundamentally have a rectangular hysteresis loop, but that it suffices if the material has a magnetic remanence. Another advantage is that the strength of the pulses may be much greater than corresponds to the coercive force so that the state of magnetisation may change very rapidly.

In order that the invention may be readily carried into effect the invention will now be described in detail, by way of example, with reference to the accompanying diagrammatic drawings, in which.

Figure 1:
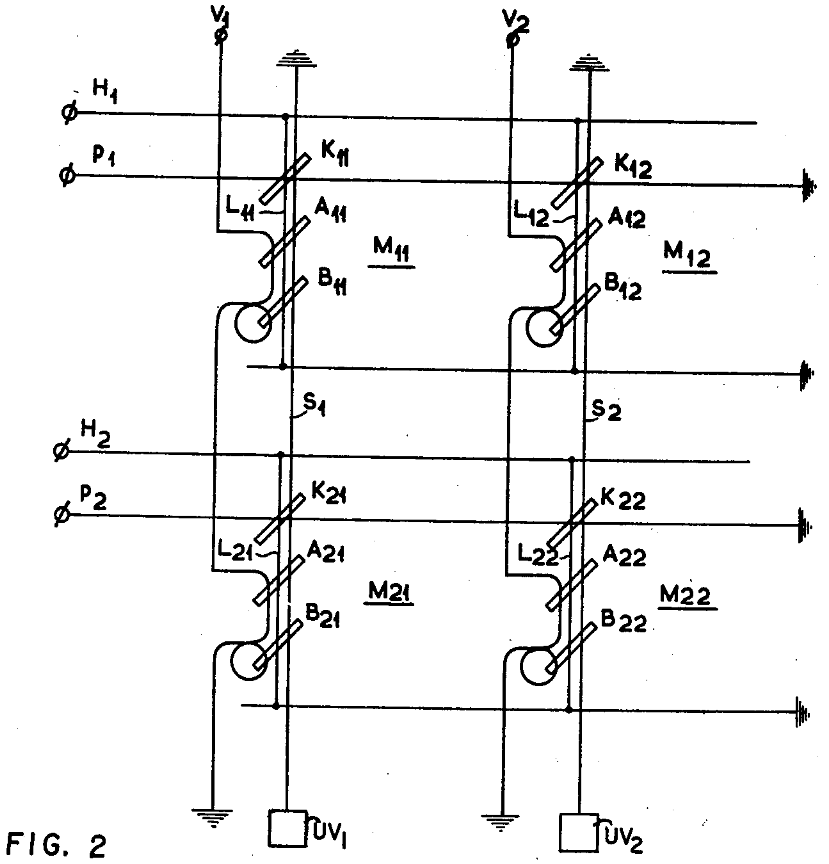
FIGURE 1 is a circuit diagram of one embodiment of the invention.

FIGURE 1 shows a matrix memory device having four memory elements M11, M12, M21, M22, which are ranged in two rows and two columns. It will be evident that this number may be increased according to requirements. Each of the memory elements comprises a memory core K11, K12, K21 and K22 respectively of magnetic material having a comparatively high remanence and two auxiliary cores A11, B11; A12, B12, etc. of magnetic material having a high permeability. The memory cores and the auxiliary cores of each memory element are coupled to common auxiliary conductors L11, L12, L21 and L22 respectively. The auxiliary conductors of elements of the same horizontal row, for example L11, L12 and L21, L22, respectively, are connected parallel to one another in series with horizontal control conductors H1 and H2. The auxiliary cores such, for example, as A11, B11; A21, B21 of memory elements of the same vertical column are coupled to common vertical control-conductor V1 and cores A12, B12, A22 and B22 are coupled to common vertical control conductor V2, in a manner such that the cores of the same memory element are connected together in series-opposition as compared with their coupling to the auxiliary conductors L11, L12, etc. When a pulse is supplied to a vertical control conductor V1 or V2, the auxiliary cores coupled thereto are brought into a state of magnetic saturation, but due to the resulting change in magnetisation an induction voltage is not produced in the auxiliary conductors, whereas upon variation in the current through an auxiliary conductor a voltage is not induced in a vertical control conductor.

Said circuit further operates as follows:

When a given memory core, for example K11 of the memory element M11, must be brought into a given magnetic state of information, a pulse is supplied simultaneously to the row conductor and the column conductor corresponding to the relevant elements, in this case H1, and V1, respectively. Consequently, a current flows through conductor H1 and auxiliary conductor L11 to earth, which current is such that the coercive force in core K11 is exceeded and this core passes to the opposite state of remanence. In fact since, the cores A11 and B11 are magnetically saturated as a result of the current flowing through conductor V1, the inductance of conductor L11 is comparatively low and the current through this conductor is thus not limited. On the other hand, the cores A12 and B12 of memory element M12 are not saturated, since, as it is assumed, the conductor V2 is not traversed by current. The inductance of conductor L12 is then comparatively high, so that the current through conductor L12 is limited and the magnetic state of core K12 is not affected. The magnetisation of core K21 cannot be changed either, if at least no pulse is supplied to conductor H2, since, as previously mentioned, the conductors V1 and L21 are not coupled together. It will be evident that it is thus also possible to register at the same time information in a number of cores of the same row or the same column by supplying simultaneously a pulse to the two control conductors corresponding to these cores.

An advantage of this device is that the pulses may be made very strong within certain limits, since they are no longer bound to given properties of the material, such as is the case in known systems. The speed of the change in magnetisation may thus also be much greater than in known devices.

A given direction of magnetisation of a core corresponds, as is well-known, to a given binary information, for example, the digit "1," whereas the opposite direction of magnetisation corresponds to the digit "0." A given information may be registered in the manner above described. If, now, it is desired to read out the information from a given line, for example from the memory cores K11 and K12, a primary reading pulse is supplied to a reading conductor P1 and P2, which are coupled to these cores. The polarity of these pulses is such that the cores which are in the state "1" are thus brought into the state "0," a reaction pulse thus being produced in vertical outlet conductors S1 and S2 coupled to these cores, which pulse is then supplied to reading out amplifiers UV1 and UV2.

In the arrangement shown, the auxiliary conductors of the same row are connected parallel to one another. It is then necessary to supply pulses of given voltages to the row control conductors.

Figure 2:
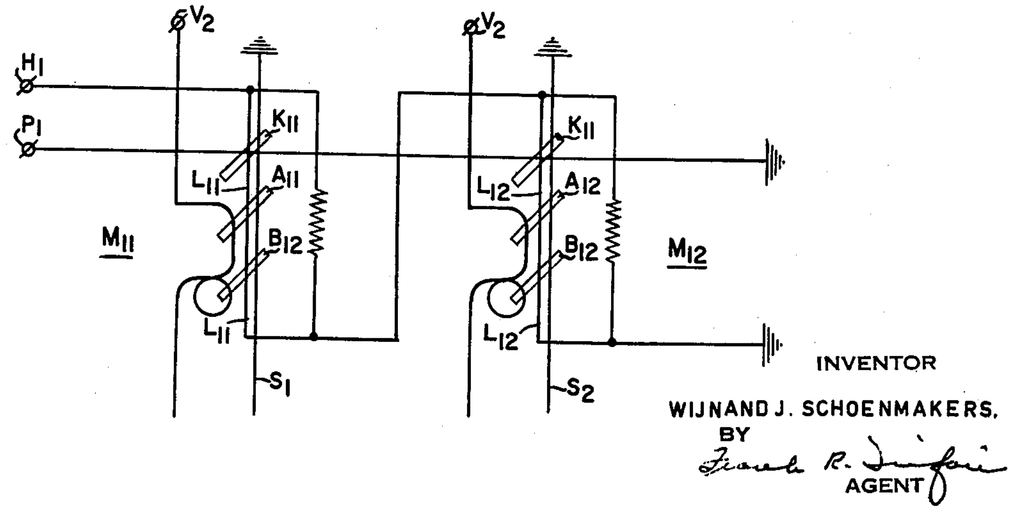
FIGURE 2 is a circuit diagram of a modification of the circuit of FIGURE 1.

In another embodiment of a device according to the invention, as illustrated in FIGURE 2 the auxiliary conductors are connected together in series, each being bridged by an individual resistor R. In this case, each memory element comprises two parallel current branches, one comprising the auxiliary conductor and the memory core coupled thereto and a pair of auxiliary cores, and the other comprising the resistor. The total current traversing the parallel branches is the same for all the memory elements of one row, but the ratio of the currents through the branches and hence the current through the auxiliary conductor is again determined by the state of magnetisation of the auxiliary cores.

What is claimed is:

1. A matrix memory system comprising a plurality of first core elements of magnetic material having a comparatively high remanence, said first core elements being arranged in rows and columns, a plurality of second and third core elements of magnetic material having a comparatively low remanence and showing magnetic saturation, each of said first core elements having an associated second and third core element, separate first control conductor means associated with each said row and being coupled to each first, second and third core element in the respective row, and separate second control conductor means associated with each said column and being coupled in opposition to each second and third core element in the respective column.

2. The system of claim 1, in which said first control conductors are coupled serially with respect to each group of associated first, second and third core elements, and the coupling between said first control conductors and the groups of elements of irrespective row are in parallel.

3. The system of claim 1, in which said first control inductors are coupled serially with respect to each group of associated first, second and third core elements, the coupling between said first control conductors and the groups of elements of the respective row are in series, and resistance means are connected in parallel with the coupling of the first control conductor to each said group.

4. A matrix memory system comprising a plurality of groups of magnetic core elements, said groups being arranged in rows and columns, each said group comprising a first core element having a comparatively high remanence and a second and third core element each having a comparatively low remanence and exhibiting magnetic saturation, a separate row conductor for each row of said system and coupled to each first, second and third core element of the respective row, and a separate column conductor for each column of said system and coupled to each second and third core element of the respective column, the coupling between said first and second control conductors and each said second core elements being in the same direction and the coupling between said first and second control conductors and each said third core element being in opposition.

5. A matrix memory system comprising a plurality of groups of magnetic core elements, said groups being arranged in rows and columns, each said group comprising a first core element having a comparatively high remanence and a second and third core element each having a comparatively low remanence and exhibiting magnetic saturation, a separate row conductor for each row of said system and coupled to each first, second and third core element of the respective row, and a separate column conductor for each column of said system and coupled in relative opposition to the second and third core elements of each said group of the respective column.

References Cited in the file of this patent

UNITED STATES PATENTS 2,768,367 Rajchman -------------- Oct. 23, 1956

OTHER REFERENCES

"Experiments on Three Core Cell etc.," J. Raffel, S. Bradspies, I.R.E. Convention Record, 1955, National Convention, part 4, Computers and Information Theory, pp. 64–69.